(12) United States Patent
Iimura et al.

(10) Patent No.: US 6,616,871 B1  
(45) Date of Patent: Sep. 9, 2003

(54) FILLING STEP CONTROL METHOD OF INJECTION MOLDING MACHINE

(75) Inventors: Yukio Iimura, Sunto-gun (JP); Makoto Nishizawa, Numazu (JP); Kazuhito Kobayashi, Numazu (JP); Haruyuki Matsubayashi, Numazu (JP); Nobuyuki Asanuma, Numazu (JP); Yutaka Yamaguchi, Tagata-gun (JP); Kiyoshi Sasaki, Mishima (JP); Yasumasa Sugiyama, Mishima (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/705,797

(22) Filed: Nov. 6, 2000

(30) Foreign Application Priority Data

Nov. 5, 1999 (JP) .......................................... 11-314706

(51) Int. Cl.[7] .............................................. B29C 45/77
(52) U.S. Cl. ...................................... 264/40.1; 425/145
(58) Field of Search .............................. 264/40.1, 40.5, 264/40.7; 425/145

(56) References Cited

U.S. PATENT DOCUMENTS 5,738,809 A * 4/1998 Hara et al. ................. 264/40.5
6,060,005 A * 5/2000 Hettinga ................ 264/328.12

* cited by examiner

Primary Examiner—Jill L. Heitbrink  
(74) Attorney, Agent, or Firm—Pillsbury Winthrop LLP

(57) ABSTRACT

A filling step control method of an injection molding machine for filling a molten resin into a die cavity is provided. The control method has the steps of: sampling in initiating the filling step for filling the molten resin into the die cavity by controlling an injection speed and, thereafter, by controlling a filling pressure while not exceeding a predetermined value; storing the injection speed over an entire filling process when a quality product can be stably obtained during the sampling step into a storage medium as a reference waveform; and after storing the reference waveform, molding for filling the molten resin into the die cavity by controlling the injection speed to follow the reference waveform over the entire filling step.

2 Claims, 4 Drawing Sheets

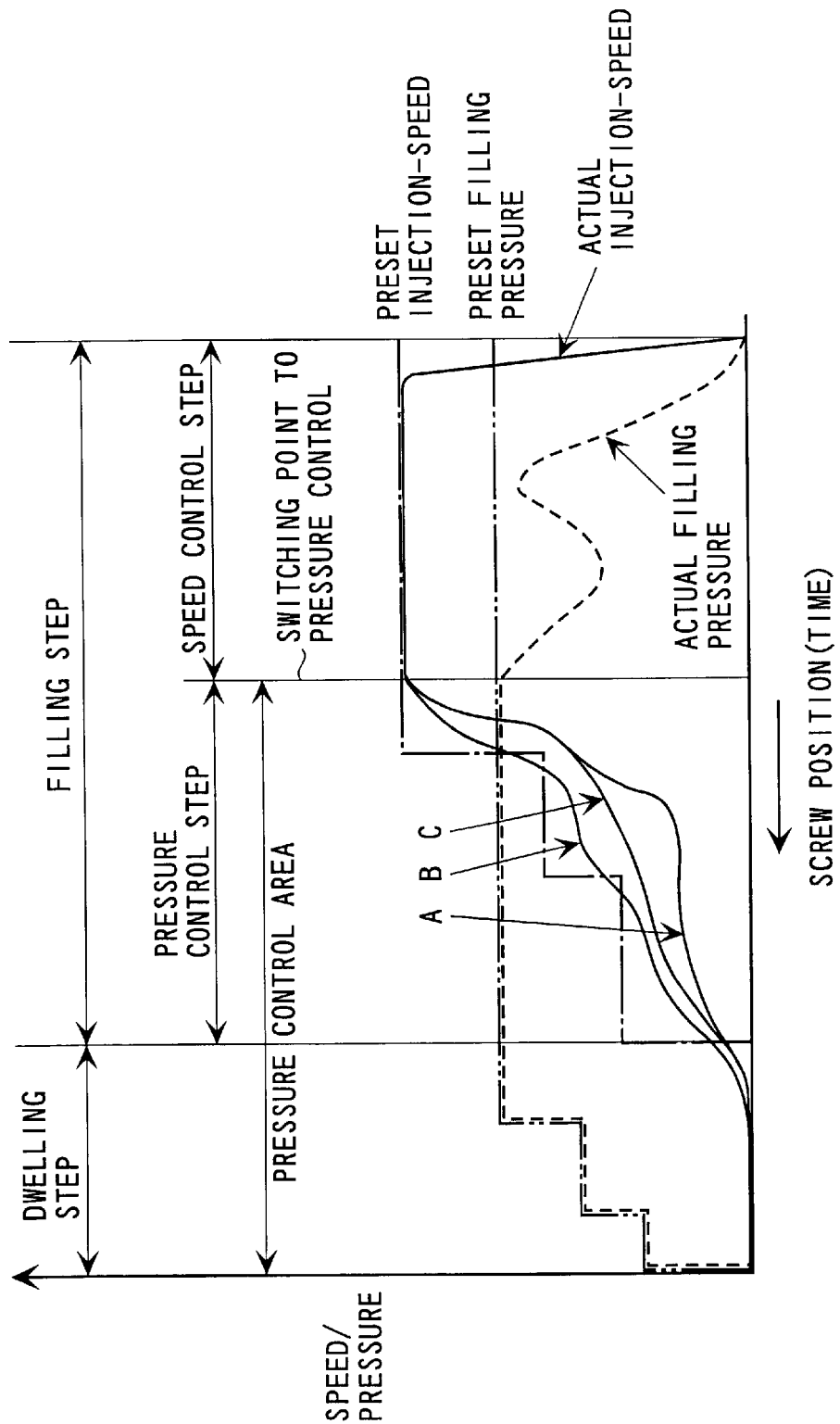

FILLING STEP CONTROL METHOD OF INJECTION MOLDING MACHINE

BACKGROUND OF THE INVENTION

1. Field of the Invention

The present invention relates to a control method of filling step of an injection molding machine by controlling speed or pressure. More specifically, it relates to a filling step control method capable of eliminating fluctuation of injection speed during pressure control step, thus constantly obtaining molding products of good quality.

2. Description of Related Art

Conventionally, in an injection process including a filling step for filling molten resin material into a die cavity and a dwelling step for pressing the filled resin material to compensate contraction of the resin material filled in the die cavity on account of cooling, a preset filling pressure is set high so that an actual filling pressure does not exceed the preset filling pressure, injection speed is controlled at a multi-stage during the filling step and pressure to the resin filled inside the cavity is controlled in multi-stage during the dwelling step as shown in FIG. 3.

On the other hand, a low-pressure injection molding method without applying so high pressure has recently been used. In the low-pressure injection molding method, the preset filling pressure is set low as shown in FIG. 4. In initiating injection, the speed is controlled to be a preset injection speed, and subsequently, after the actual filling pressure is raised to reach approximately the preset injection pressure, the pressure is controlled so that the actual filling pressure does not exceed the preset filling pressure.

According to the low-pressure molding method, since an injection machine capable of filling at a high-pressure is not required, the cost for the machine itself can be reduced. Further, since the filling operation is conducted at the low-pressure, running cost for the injection machine can also be reduced.

Further, since the resin is injected at the low-pressure, the size of the die and peripherals can be reduced. Furthermore, energy required for operating the device can be reduced.

However, in the low-pressure injection molding, the injection speed was fluctuated as shown in lines A, B and C in FIG. 4 in an area for controlling the filling pressure (pressure control step) during the filling process.

The above phenomenon is thought to occur since the resin injection is totally dependent on pressure control, thus varying action of the resin inside the die.

On account of the fluctuation of the injection speed, quality of the molding product obtained for each shot has different qualities, thus not constantly obtaining quality products.

SUMMARY OF THE INVENTION

An object of the present invention is to overcome the above deficiency of the low-pressure injection molding where the injection speed was fluctuated for each shot during pressure control step and quality product was not obtained, and to provide a filling step control method of an injection molding machine capable of constantly obtaining quality products.

In order to achieve the above object, a filling step control method of an injection molding machine for filling a molten resin into a die cavity according to the present invention has the steps of: sampling in initiating the filling step for filling the molten resin into the die cavity by controlling an injection speed and, thereafter, by controlling a filling pressure while not exceeding a predetermined value; storing the injection speed over an entire filling process when a quality product can be stably obtained during the sampling step into a storage medium as a reference waveform; and after storing the reference waveform, molding for filling the molten resin into the die cavity by controlling the injection speed to follow the reference waveform over the entire filling step.

Accordingly, an injection speed waveform in the entire filling process when a quality product is obtained while conducting pressure control step by controlling pressure is stored in a controller of an injection molding machine as a reference waveform, and the molding step after storing the reference waveform is conducted following the reference waveform, thus capable of constantly molding quality products.

In the present invention, the sampling step and storing step for storing the reference waveform may preferably be conducted in advance, and the molding operation step may preferably be conducted using the reference waveform obtained during the sampling step and the storing step.

Accordingly, the reference waveform for the same molding die can be recycled for the same type dies even when the molding dies are frequently exchanged to mold variety of small number of molding products. Since repeated sampling process can be omitted, production efficiency can be improved.

Further, the injection speed may preferably be controlled during the molding by setting a plurality of injection speed values and switching positions of respective injection speed values.

In the present invention, the reference waveform may be represented using an approximate curve. However, the injection speed can be controlled with simpler arrangement by controlling the injection speed while setting the plurality of injection speed values and switching positions of respective injection speed values.

Further, the filling pressure may preferably be detected to raise an alarm when the filling pressure exceeds a predetermined upper preset pressure. Accordingly, safe molding operation is possible even when the pressure is not controlled during the molding operation.

BRIEF DESCRIPTION OF THE DRAWINGS

FIG. 4 is a graph showing a condition of injection speed in a pressure control area in the conventional injection process.

DETAILED DESCRIPTION OF PREFERRED EMBODIMENT(S)

Figure 1:
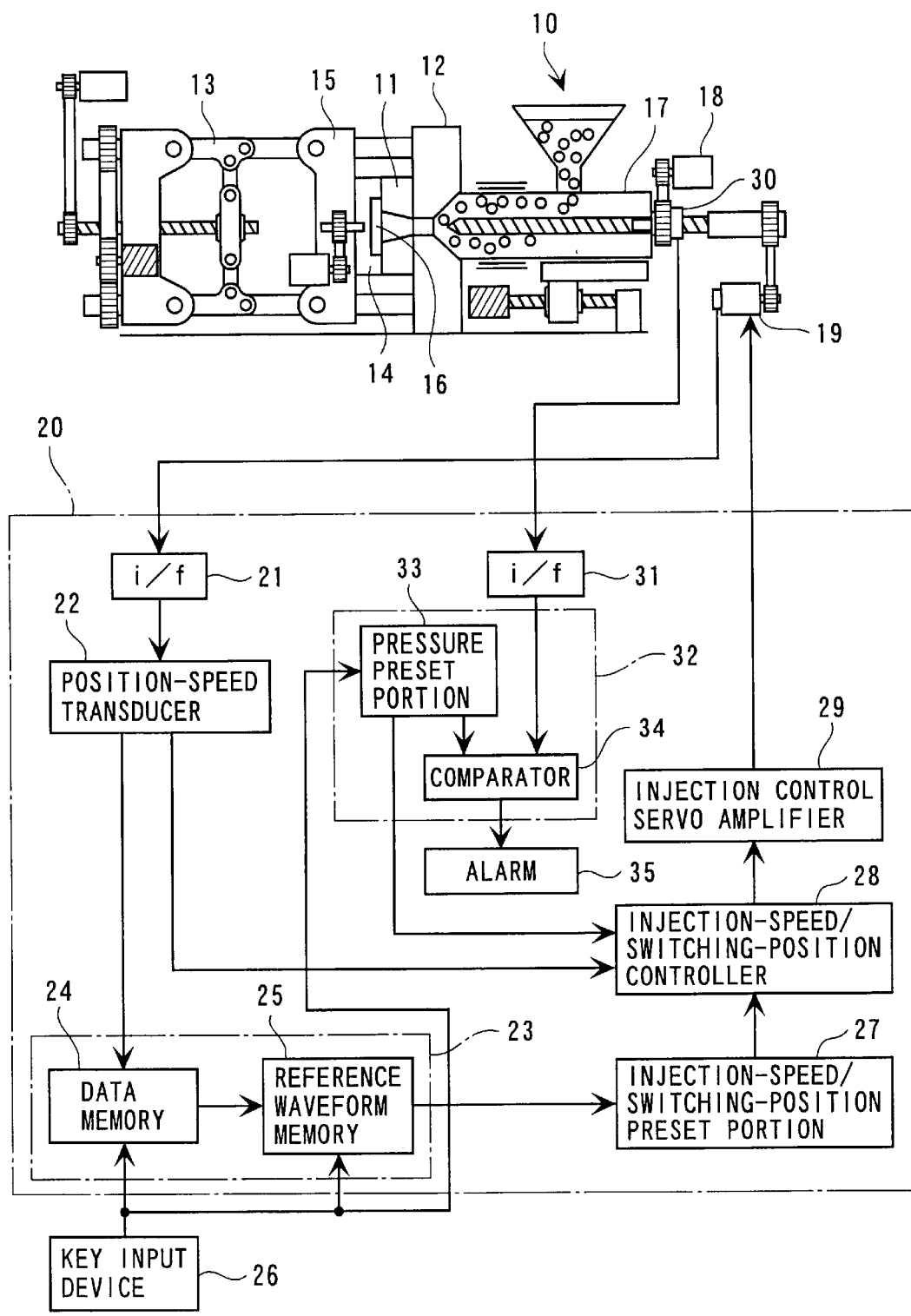
FIG. 1 is an illustration showing a filling step control method of an injection machine according to an embodiment of the present invention.

An embodiment of the present invention will be described below with reference to FIG. 1 showing an injection machine driven by an electric motor.

An injection molding machine 10 has a stationary plate 12 attached with a stationary die 11 and a movable plate 15 attached with a movable die 14, the movable die 14 being movable toward and away from the stationary plate 12 by a toggle mechanism 13, the dies 11 and 14 forming a cavity 16. A molten resin measured by a measurement control servomotor 18 of an injection device 17 is filled into the cavity 16 by an injection control servomotor 19. The above arrangement is well known in the art and detailed description thereof is omitted.

The injection molding machine 10 is controlled by a controller 20. The injection control servomotor 10 is connected to a position-speed transducer 22 via an interface 21. The position-speed transducer 22 is for converting an encoder position into an injection speed. The position-speed transducer 22 counts filling time based on a signal from a sequencer (not shown) and outputs a waveform of the injection speed to a memory 23 in a sampling mode in accordance with the filling time (in total injection step including the pressure control area of FIG. 4).

The memory 23 has a data memory 24 and a reference waveform memory 25. The waveform of the injection speed transmitted for each molding cycle from the position-speed transducer 22 is stored every time into the data memory 24. When a machine operator considers an obtained product as a quality product, the waveform of the injection speed at the molding cycle is stored from the data memory 24 into the reference waveform memory 25 as a reference waveform by pushing a key of a key input device 26 etc.

The reference waveform stored in the reference waveform memory 25 is automatically set to an injection-speed/ switching-position preset portion 27 for setting a plurality of injection-speed value and a switching-position of the respective injection speed. Thereafter, the reference waveform is transmitted to an injection-speed/switching-position controller 28, and is fed back to the injection control servomotor 19 via an injection control servo amplifier 29. Further, the position-speed transducer 22 is connected to the injection-speed/switching-position controller 28, so that the injection-speed and switching-position during the pressure control step in FIG. 4 can be controlled.

An injection pressure detector 30 connected to an injection pressure controller 32 through an interface 31 is provided to the injection device 17. The injection pressure controller 32 has a pressure preset portion 33 for setting the preset filling pressure and an upper allowable limit of a preset pressure, and a comparator 34 for comparing the upper preset pressure equal to sum of the preset pressure and the upper allowable limit with a detection value (actual filling pressure) detected by the injection pressure detector 30. The comparator 34 compares the actual pressure detected by the injection pressure detector 30 with the upper preset pressure and, when the actual filling pressure exceeds the upper preset pressure, the comparator 34 generates a signal to work an alarm 35.

Figure 2:
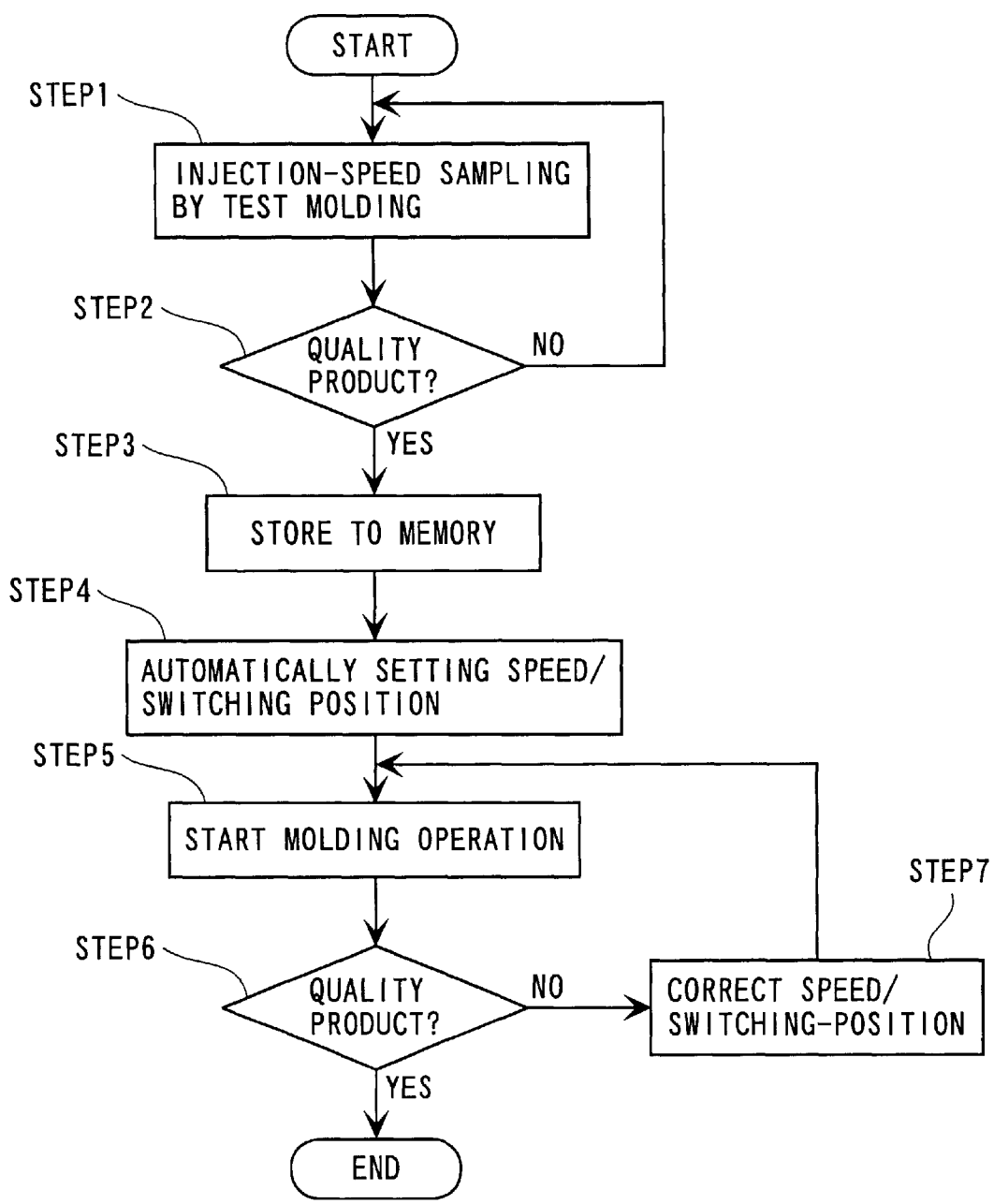
FIG. 2 is a flowchart showing an operation of the aforesaid embodiment of the present invention.
Figure 3:
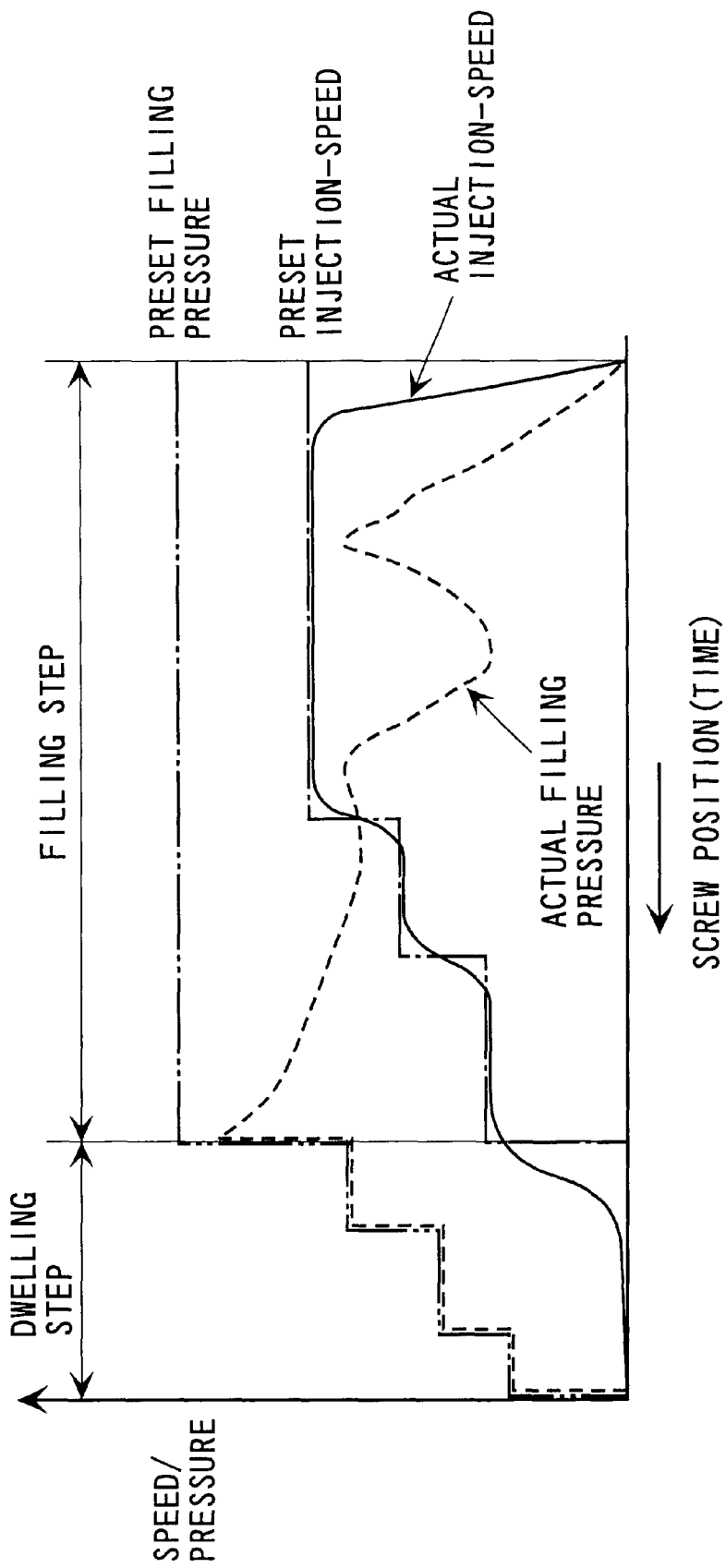
FIG. 3 is a graph showing a relationship between a screw position and speed/pressure in a conventional injection process.

Next, a function of the above arrangement will be described below with reference to a flowchart shown in FIG. 2.

First, a sampling operation for obtaining the reference waveform before a molding operation is conducted according to the low-pressure injection molding method as shown in FIG. 4, thus sampling waveform of the injection speed over an entirety of the injection step (STEP1). Subsequently, an operator judges whether the obtained product is a quality product or not (STEP2). When a quality product is obtained, the waveform of the injection speed at the time is stored in the memory 23 as a reference waveform (STEP3). When the quality product is not obtained, the sampling step of STEP1 is repeated until a quality product is obtained. Next, the reference waveform is fetched from the memory 23 and the speed and the speed switching position is automatically set (STEP4). Accordingly, the molding operation becomes possible (STEP5). The quality of the product is judged in STEP6, and the operation is continued if a quality product is obtained. If the quality product is not obtained, then go to STEP7 to correct the speed and the speed switching position, thus repeating the same operation until quality product is obtained.

Incidentally, the sampling operation and the molding operation are sequentially conducted in the above embodiment. However, the sampling process of the reference waveform by the sampling operation may be separately conducted in advance.

Specifically, the sampling operation may be separately conducted in advance to the molding operation, and the speed during the molding operation independently conducted after the sampling operation may be controlled based on the reference waveform obtained by the sampling operation.

Accordingly, the reference waveform for the same molding die can be recycled for the same type dies even when the molding dies are frequently exchanged to mold variety of small number of molding products. Since repeated sampling process can be omitted, production efficiency can be improved.

What is claimed is:

1. A method of controlling the filling of molten resin into a die cavity of an injection molding machine die, comprising:

prior to an actual molding operation, determining a reference waveform modeling the appropriate injection speeds during a filling of a particular injection molding die, the waveform to be later used during an actual injection process to control injection speed, the reference waveform being obtained by sampling during a trial filling of molten resin into the die cavity of the die being modeled while controlling injection speed and thereafter, controlling a filling pressure while not exceeding a predetermined value;

storing the reference waveform which represents a profile of appropriate injection speeds over an entire filling process when a quality product can be stably obtained into a storage medium for later use during actual injection molding operations;

after storing the reference waveform, carrying out actual injection molding including filling the molten resin into the die cavity by controlling the injection speed according to the reference waveform over the entire filling of the die; and detecting the filling pressure and providing an alarm when the filling pressure exceeds a predetermined upper preset pressure, the predetermined upper preset pressure being the sum of a preset target pressure based on the reference waveform and an upper allowable limit.

2. The filling step control method according to claim 1, wherein the injection speed is controlled during the molding by setting a plurality of injection speed values and switching positions of respective injection speed values.

* * * * *